United States Patent [19]
Koster

[11] 3,806,936
[45] Apr. 23, 1974

[54] PERSONAL LOCATOR
[75] Inventor: Charles A. Koster, Phoenix, Ariz.
[73] Assignee: Aero Electronics Development Co., Inc., Tempe, Ariz.
[22] Filed: Aug. 14, 1972
[21] Appl. No.: 280,503

[52] U.S. Cl............. 343/113 PT, 343/119, 325/16, 325/111, 325/118, 325/361
[51] Int. Cl................................................. G01s 5/02
[58] Field of Search............. 343/113 PT, 119, 718; 325/16, 111, 118, 361

[56] References Cited
UNITED STATES PATENTS

| | | |
|---|---|---|
| 3,440,635 | 4/1969 | Hull ................................... 325/118 |
| 3,336,530 | 8/1967 | Sloan et al. .................... 343/113 PT |
| 2,170,835 | 8/1939 | Simon ................................. 343/119 |
| 3,371,278 | 2/1968 | Gelushia et al. .................... 325/111 |

Primary Examiner—Maynard R. Wilbur
Assistant Examiner—S. C. Buczinski
Attorney, Agent, or Firm—Warren F. B. Lindsley

[57] ABSTRACT

A tone modulated transmitter and a pair of radio receiver circuits provide a personal locator which can transmit emergency distress signals and can receive signals which are used to indicate the direction from which the signals are being received. The locator is small enough to be carried in a pocket or connected to the pants belt of a user.

10 Claims, 6 Drawing Figures

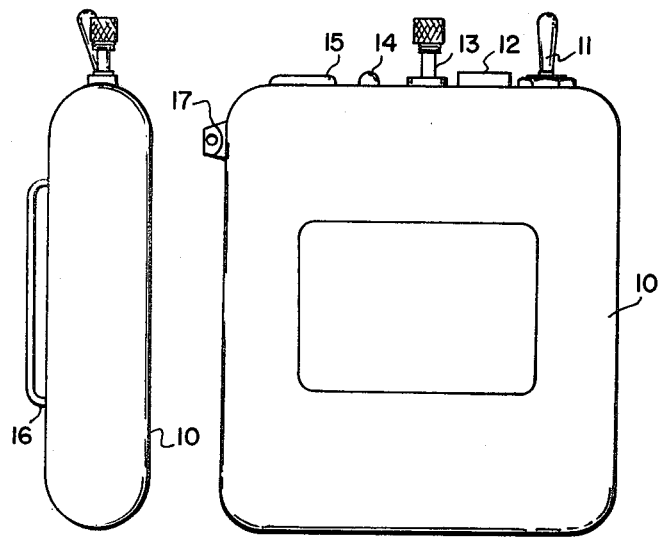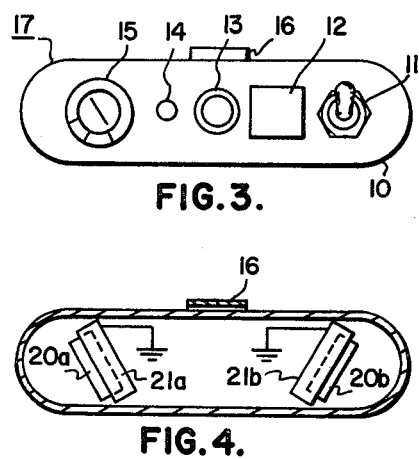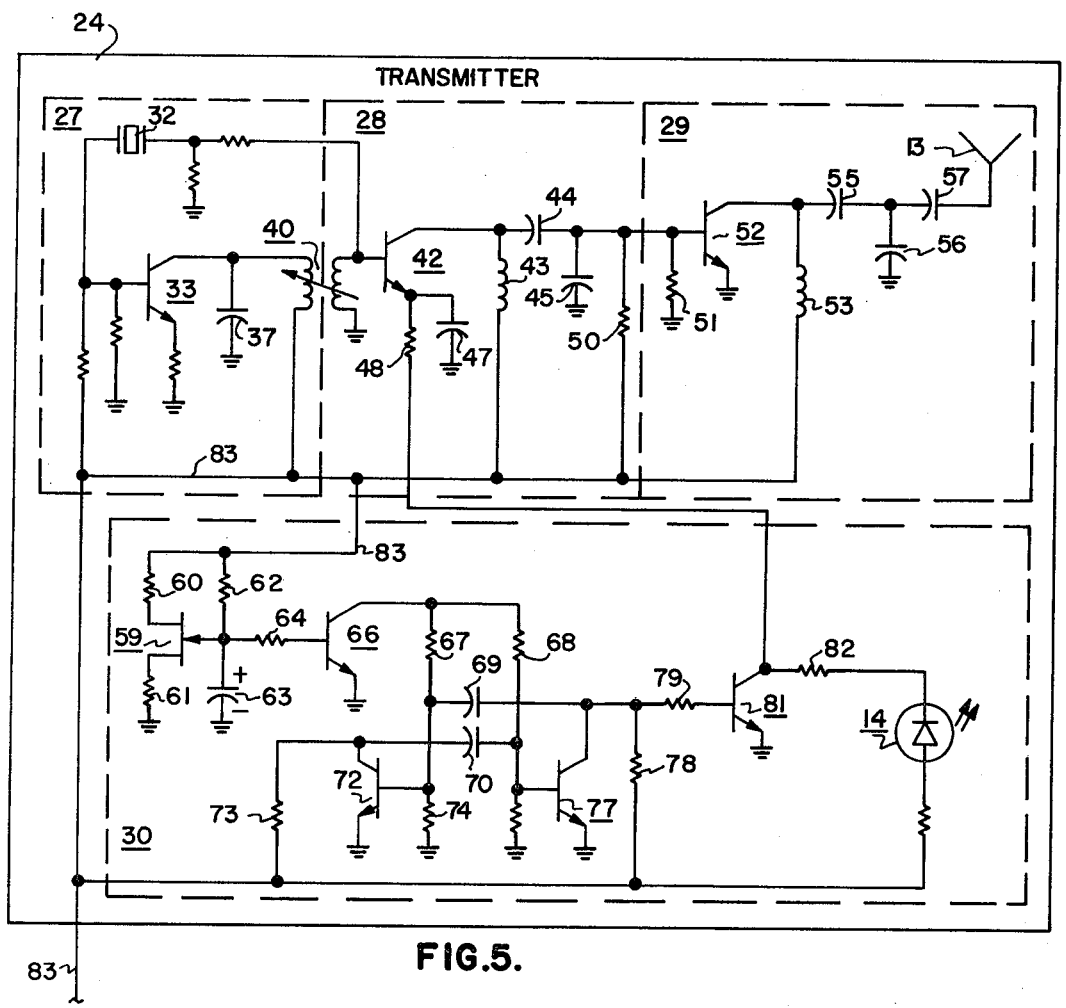

PERSONAL LOCATOR

BACKGROUND OF THE INVENTION

This invention relates to a personal locator, and more particularly to a locator small enough to be carried in the pocket of a sportsman or connected to the person by a belt. The locator can either transmit a tone modulated emergency signal or can receive a signal from another transmitter and indicate the direction of the received signal. The locator has a sending and receiving range of several miles.

Each year during the hunting and fishing season sportsmen become lost in areas where the population is sparse and where food, water and shelter may be difficult or impossible to find. Also, explorers and travelers in some of the arid regions may become lost or their vehicles may break down so that they become stranded. It is frequently time consuming and expensive to try to find these lost or stranded people, even when someone is aware that they are missing. Often a considerable period of time elapses before anyone realizes that these people are lost or missing. It is not uncommon for lost or stranded people to die before they can be reached. What is needed is a personal locator which can be used to transmit an emergency signal by a person who is lost or stranded. It is also desirable that a lost person be able to receive radio signals from a transmitter at a fixed position or from a transmitter operated by a member of a search team and be able to detect the direction from which the signals are being transmitted. If these personal locators are to be widely used by sportsmen and travelers, it is important that the locator be compact, easy to carry and relatively inexpensive. It is also important that the locator be able to transmit and receive radio signals over relatively long distances.

Prior art direction finding radio receivers are relatively large and expensive. Also, such prior art receivers indicate that signal being received could come from either of two directions, the correct direction of an incorrect direction 180° from the correct direction. The present invention has means for eliminating the 180° error indication.

The present invention can be used on the Citizens Radio Band or on assigned marine and forest service emergency frequencies. The present invention produces a distinct audio emergency signal by sweeping through a frequency of 1600 hz to 300 hz approximately three times per second.

It is, therefore, an object of this invention to provide a new and improved personal locator.

Another object of this invention is to provide a compact, portable personal locator.

Another object of this invention is to provide an inexpensive personal locator.

Still another object of this invention is to provide a personal locator which can transmit an emergency signal.

A still further object of this invention is to provide a personal locator which can detect the direction of a received signal.

Another object of this invention is to provide a personal locator having a useful range of several miles.

Other objects and advantages of the present invention will become apparent from the following description when taken in connection with the accompanying drawings.

SUMMARY OF THE INVENTION

The foregoing objects are achieved in the present invention by providing a compact and inexpensive personal locator having an effective range of several miles for both transmitting and receiving radio signals. The receiving portion of the personal locator has means for eliminating the 180° error indication which exists in the state of prior art locators.

BRIEF DESCRIPTION OF THE DRAWINGS

The present invention may be more readily described by reference to the accompanying drawings, in which:

FIG. 1 is a front view of one embodiment of the present invention;

FIG. 2 is a side view of one embodiment of the present invention;

FIG. 3 is a top view of one embodiment of the present invention showing placement of the controls and indicating devices;

FIG. 4 is a cross-sectional view of the present invention as seen from the top;

FIG. 5 is part 1 of a circuit diagram of one embodiment of the present invention.

DESCRIPTION OF THE PREFERRED EMBODIMENT

Figure 6:
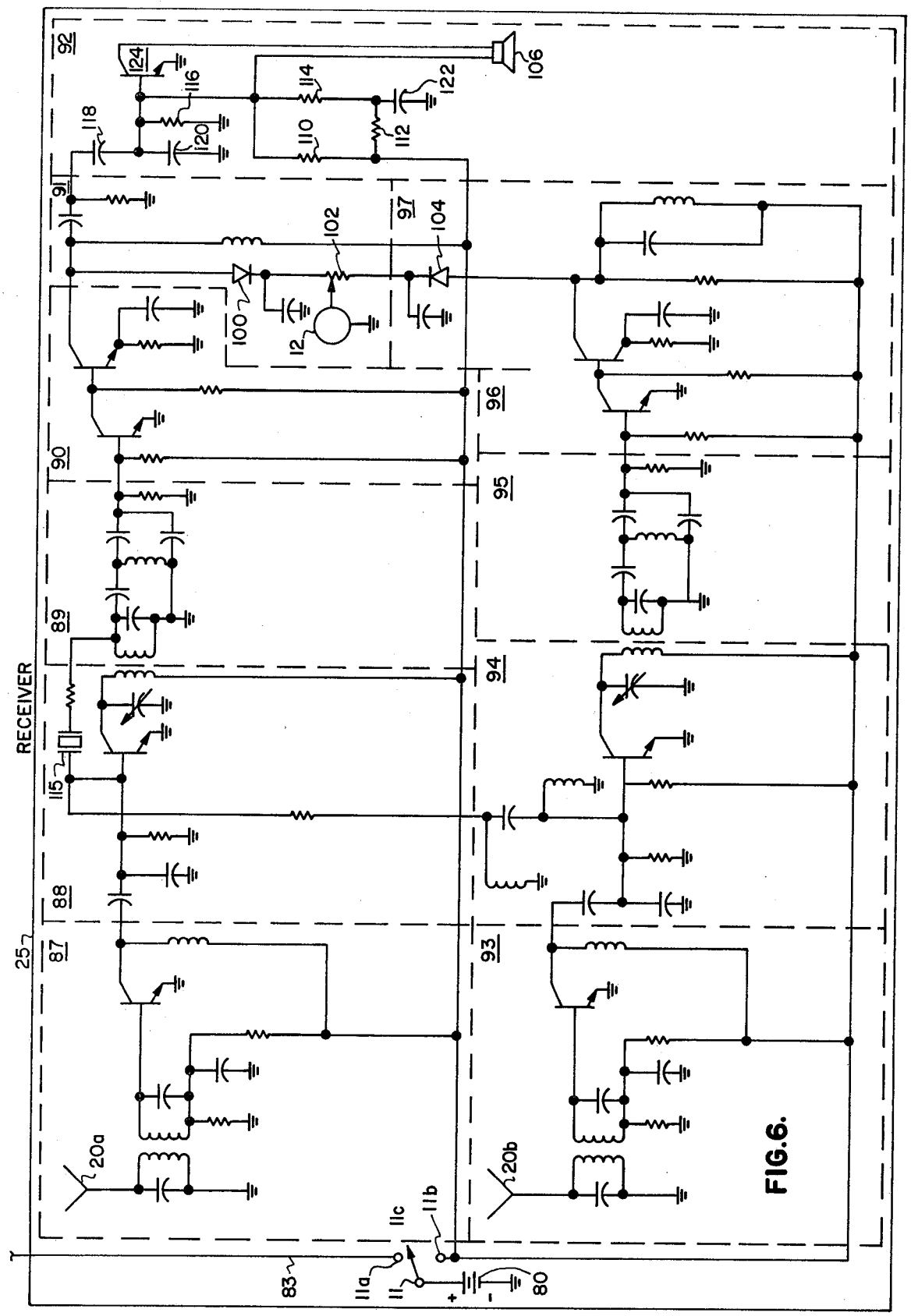
FIG. 6 is part 2 of the circuit diagram shown in FIG. 5.

The personal locator shown in FIGS. 1–4 includes a nonmetallic case 10 having a toggle switch 11, a direction finding meter 12, a pull-up transmitting antenna 13, a light emitting diode 14 and a battery indicator meter 15 mounted on the top of case 10. The case may be secured to the person by a belt loop 16 or by a lanyard loop 17, which are connected to the rear of the case 10. FIG. 4 illustrates the position of the directional receiving antennas 20a and 20b which are mounted partially inside magnetic shields 21a and 21b.

The circuits of the personal locator shown in FIGS. 5 and 6 disclose a tone modulated radio transmitter section 24 and a receiver section 25. The transmitter section includes a crystal oscillator 27, a driver amplifier 28, an output amplifier 29 and a tone modulator 30. The operating frequency of the transmitter is controlled by a crystal 32 in the oscillator. Since the components of the crystal oscillator 27, driver amplifier 28, output amplifier 20 and tone modulator 30 are well known in the art, they are shown in the drawing in correct circuit configuration but only characteristic functional elements needed for explanation purposes are given reference characters for simplicity. The crystal oscillator 27 comprises in addition to crystal 32, transistor 33 and variable inductance 40 in combination with suitable resistors and capacitor 37, as shown.

A radio frequency signal is developed by oscillator 27 and amplified by driver amplifier 28 and output amplifier 29. The tone modulator 30 develops an audio frequency signal which is coupled to the driver amplifier 28, causing the radio frequency signal to be amplitude modulated by the audio frequency. The modulated radio frequency signal is amplified by output amplifier 29 and its circuitry including transistor 52 and coupled to the transmitting antenna 13.

The audio frequency signal is generated by an audio generator which includes unijunction transistor 59, resistors 60-62 and capacitor 63, and by a multivibrator which includes transistors 72 and 77. A unijunction transistor is a semiconductor device having a first base or "base-one," a second base or "base-two" and an emitter. If a positive voltage difference exists between base-two and base-one, the unijunction transistor cannot conduct current between the emitter and base-one until a voltage greater than a first predetermined threshold or "peak point voltage" value exists between the emitter and base-one. When the voltage on the emitter is more than the peak point voltage, current flows from emitter to base-one until the emitter voltage decreases below a second predetermined or "valley voltage" value.

When the arm 11c of switch 11 is selectively connected to terminal 11a of terminals 11a and 11b of switch 11, positive voltage from battery 80 is applied to base-two of the unijunction transistor 59 through conductor 83 and resistor 60. Base-one is connected to ground by resistor 61. The positive voltage at the top of resistors 60 and 62 cause a current to flow through resistor 62 to the upper plate of capacitor 63 and from the lower plate of capacitor 63 to ground, causing capacitor 63 to charge to the polarity shown in FIG. 5.

When the voltage across capacitor 63 reaches the peak point voltage, current flows from the upper plate of capacitor 63 through emitter to base-one of unijunction transistor 59 and then through resistor 61 to the lower plate of capacitor 63. The emitter to base-one current causes capacitor 63 to discharge below the valley voltage of the unijunction transistor so that current no longer flows. The capacitor recharges through resistor 62 and again discharges through the unijunction transistor. The voltage across capacitor 63 increases and decreases at a low rate such as three times per second. This changing voltage is amplified by transistor 66 and used to control the frequency of a multivibrator, which includes transistors 72 and 77 and its associated resistors 67, 68, 74, 78 and 79 and capacitors 69 and 70 connected as shown. The multivibrator produces an audio signal which is amplified by transistor 81 and applied to the emitter of transistor 42 through resistor 82.

The frequency of the voltage from transistor 66 is approximately 3 hz. The varying voltage from transistor 66 causes the audio frequency of the multivibrator to change over an audio frequency range of approximately 300 hz to 1,600 hz three times per second. This audio frequency can easily be distinguished from other signals which may be transmitted over the same radio frequency band as the emergency signal from the personal locator. This audio signal causes the amplitude of the radio signal from the driver amplifier 28 to vary at the audio rate. The signal from transistor 81 is coupled by resistor 82 to a light emitting diode 14, causing the diode 14 to glow when the transmitter is sending signals. A light emitting diode is a semiconductor device having an anode and a cathode. The diode emits light when the diode is biased in a forward direction so diode 14 emits light on alternate half cycles of the audio signal to show that the transmitter is operating.

The receiver section 25 of the personal locator includes two radio receiver circuits energized when arm 11c of switch 11 is connected to terminal 11b. The first circuit includes an RF amplifier 87, a converter 88, an IF filter 89, an IF amplifier 90, a detector 91 and an audio amplifier 92. The second circuit includes an RF amplifier 93, a converter 94, an IF filter 95, and IF amplifier 96 and detector 97.

Since the components of the radio receiver circuits are well known in the art, they are shown in FIG. 6 of the drawing in correct circuit configurations, but only characteristic functional elements needed for explanation are given reference characters, for purposes of simplicity.

Converters 88 and 94 share a crystal 115, which prevents the input frequency of the IF amplifier 90 from drifting or changing. When the directional antennas 20a and 20b are pointed toward a radio frequency transmitted by, for example, a like device transmitting with its transmitter section 24, the amplitude of the signal from detector 91 should be approximately the same as the amplitude of the signal from detector 97.

The signal from detector 91 is coupled by a diode 100 to one end of potentiometer 1-2. The signal from detector 97 is coupled by diode 104 to the other end of potentiometer 102. The arm of the potentiometer 102 can be adjusted to that the voltage across meter 12 has a minimum value when the direction antennas are pointed toward a radio frequency transmitter. Thus, the meter can be used to sense the direction of a transmitter which supplies a signal to the receiver section of the personal locator.

The directional antennas are mounted as shown in FIG. 4 to reduce the possibility of a 180° error in sensing the direction of the transmitter which supplies a signal to the personal locator. A first shield 21a partially covers antenna 20a and a second shield 21b partially covers antenna 20b. When a radio frequency signal is received from a direction to the rear of the case 10 the shields reduce the amount of signal received, so that the reading on meter 12 changes slowly as the case 10 is rotated about the vertical axis of the case. When a radio frequency signal is received from a direction to the front of case 10, the reading on meter 12 changes much more rapidly as case 10 is rotated about its vertical axis. This enables the wearer of the personal locator to eliminate a 180° error in locating a radio frequency signal being received. When the true direction of the received signal has been determined a loudspeaker 106 can be used to provide an audio signal controlled by the circuitry comprising resistors 110, 112, 114 and 116, and capacitors 118, 120 and 112, and transistor 124, as shown, which enables the wearer of the personal locator to move toward the source of the signal.

While the principles of the invention have now been made clear in an illustrative embodiment, there will be many obvious modifications of the structure, proportions, material and components without departing from those principles. The appended claims are intended to cover any such modifications.

What is claimed is:

1. A personal locator comprising:
   a tone modulated radio transmitter;
   first and second radio receiver circuits, each having an input lead and an output lead;
   first and second directional antennas, said first directional antenna being coupled to said input lead of said first receiver circuit, and said second directional antenna being coupled to said input lead of said second receiver circuit;

an indicating device, said device being connected between said output leads of said first and said second receiver circuits, said device indicating the difference in signal between the output leads of said first and said second receiver circuits;
a source of electrical potential; and
means for selectively connecting said source to said transmitter and to said receiver circuit.

2. A personal locator as defined in claim 1 including:

an audio amplifier; and
a loudspeaker, said audio amplifier being connected between said output lead of said first receiver circuit and said speaker.

3. A personal locator as defined in claim 1 including:

means for generating a rapidly changing audio frequency, said means for generating being coupled to said transmitter to provide a distinctive emergency signal from said transmitter.

4. A personal locator as defined in claim 1 including:

means for shielding said first and said second directional antennas to eliminate error indication in the direction of a radio frequency signal being received.

5. A personal locator as defined in claim 4 including:

means for orienting said first and said second directional antennas to aid said means for shielding in eliminating error indication in the direction of a radio frequency signal being received.

6. A personal locator comprising:
a tone modulated radio transmitter;
first and second radio receiver circuits each having an R.F. stage, a mixer, an IF amplifier and an audio detector;
first and second directional antennas, said first directional antenna being coupled to said R. F. stage of said first receiver circuit, said second directional antenna being coupled to said R. F. stage of said second receiver circuit;
an indicating device, said device being connected between said audio detectors of said first and said second receiver circuits;
a battery; and
means for selectively connecting said battery to said transmitter and to said receiver circuits.

7. A personal locator as defined in claim 6 wherein said tone modulated transmitter includes:
a crystal controller oscillator;
an RF amplifier, said crystal controlled oscillator being coupled to said RF amplifier;
a unijunction transistor oscillator circuit;
a free running multivibrator, said oscillator circuit being coupled to said multivibrator, said oscillator circuit providing a signal to said multivibrator to cause the frequency of said multivibrator to change over an audio frequency range at a predetermined rate, said multivibrator being coupled to said RF amplifier to cause the amplitude of an RF signal of said RF amplifier to change at the audio frequency rate; and
a transmitting antenna, said transmitting antenna being coupled to said RF amplifier.

8. A personal locator as defined in claim 7 including:

means for shielding said first and said second directional antennas to eliminate error indication in the direction of a radio frequency signal being received.

9. A personal locator as defined in claim 7 including:

means for orienting said first and said second directional antennas to aid said means for shielding in eliminating a 180° error indication in the direction of a radio frequency signal being received.

10. A personal locator as defined in claim 7 including:
an audio amplifier; and
a loudspeaker, said audio amplifier being connected between said output lead of said first receiver circuit and said speaker.

* * * * *